United States Patent [19]

Shulzhenko et al.

[11] 4,021,171

[45] May 3, 1977

[54] HIGH-PRESSURE AND HIGH-TEMPERATURE DEVICE

[76] Inventors: Alexandr Alexandrovich Shulzhenko, Novo-Konstantinovskaya ulitsa, 17, kv. 27; Viktor Ivanovich Vitjuk, Radomyshlskaya ulitsa, 25, kv. 59; Jury Savvich Maslenko, ulitsa Parkhomenko, 47, kv. 59, Ala.L OF KIEV, U.S.S.R.

[22] Filed: Mar. 1, 1976

[21] Appl. No.: 662,902

Related U.S. Application Data

[63] Continuation of Ser. No. 566,828, April 10, 1975, abandoned, which is a continuation of Ser. No. 499,524, Aug. 22, 1974, abandoned, which is a continuation of Ser. No. 429,834, Jan. 2, 1974, abandoned, which is a continuation of Ser. No. 140,207, May 4, 1971, abandoned.

[30] Foreign Application Priority Data

May 12, 1970 U.S.S.R. ............................ 1434856

[52] U.S. Cl. ........................ 425/77; 425/DIG. 26; 425/408

[51] Int. Cl.² ........................................ B30B 11/32
[58] Field of Search ..................... 425/77, DIG. 26

[56] References Cited

UNITED STATES PATENTS

| 2,941,242 | 6/1960 | Hall | 425/77 X |
| 2,941,243 | 6/1960 | Bundy | 425/77 UX |
| 2,941,248 | 6/1960 | Hall | 425/77 |
| 3,088,178 | 3/1963 | Strong | 425/77 |
| 3,107,395 | 10/1963 | Bundy | 425/77 |
| 3,134,139 | 5/1964 | Wentorf | 425/77 |
| 3,172,988 | 3/1965 | Zeitlin | 425/DIG. 26 |

*Primary Examiner*—J. Howard Flint, Jr.

[57] ABSTRACT

A high pressure/temperature device comprises two complementary dies with recesses in locking surfaces thereof, the recesses forming a reaction chamber accommodating a reaction mass container. Radial slots in the die locking surface are intended for disposing therein electric conductors connected to a measuring element, e.g. a thermojunction, incorporated into the reaction mass.

4 Claims, 3 Drawing Figures

HIGH-PRESSURE AND HIGH-TEMPERATURE DEVICE

CROSS-REFERENCE TO RELATED APPLICATIONS

This application is a continuation of application Ser. No. 566,828 filed Apr. 10, 1975, now abandoned, which in turn is a continuation of application Ser. No. 499,524 filed Aug. 22, 1974, now abandoned, which in turn is a continuation of application Ser. No. 429,834 filed Jan. 2, 1974, now abandoned, which in turn is a continuation of application Ser. No. 140,207 field May 4, 1971, now abandoned.

BACKGROUND OF THE INVENTION

The present invention relates to high pressure/temperature devices and, more particularly, to apparatus for the synthesis of superhard materials, such as diamond and cubic boron nitride, in which apparatus provision is made for introducing appropriate leads, e.g., the wires of a thermoelement for temperature measurements, into the reaction zone.

A high pressure/temperature apparatus is known (see, for example, U.S. Pat. No. 3,088,170), wherein lead-ins are used as components of a measuring circuit insulated from the heating circuit and are incorporated into the reaction space (vessel) via a pyrophyllite packing (burr).

This prior art apparatus is disadvantageous in that the lead-ins pass through a packing (burr) and this arrangement causes frequent mechanical damage of breakage of thermoelement wires which are affected by marked mechanical loads and undergo significant strains in the zone of the pyrophllite burr packing. The apparatus suffers from a further drawback of rendering the insulation of the measuring circuit susceptible to damage as a result of packing (burr) material flow, so that an electric contact between the measuring circuit and apparatus elements is likely to occur.

SUMMARY OF THE INVENTION

It is an object of the present invention to provide a high pressure/temperature device having reliable lead-ins into the reactive vessel.

It is another object of the present invention to provide a high pressure/temperature device, in which pressure application will cause minimum strain in the thermoelement wires in order to prevent mechanical damage or breakage of the wires.

It is a further object of the present invention to provide a high pressure/temperature device which will make it possible to introduce a plurality of sensors, e.g. thermojunctions, into the reaction vessel and, hence, to obtain a plurality of measuring circuits which are independent of the heating circuit.

With these and other objects in view, in the high pressure/temperature device comprising two identical dies with recesses in the closing surfaces thereof, which recesses form, as the dies are locked, a high-pressure reaction chamber accommodating a reaction mass container made from a heat- and electroinsulating material exhibiting plastic properties when subjected to uniform compression, and lead-ins wherein, according to the present invention, the lead-ins are placed in slots made in the die body so as to be electrically insulated from the material of the die and disposed outside the zone of intensive flow of the container material.

This arrangement eliminates the breakage of lead-ins in the course of the reaction in the chamber.

The lead-ins may comprise wire conductors connected in a thermojunction disposed inside the container and the reaction mass, the conductors being furnished with electric insulation and placed in slots provided for this purpose in the recess and in the closing surface of the die.

Powdered lithographic stone is the preferred insulation for the conductors.

In a specific embodiment of the present invention, the slots for each lead-in are arranged radially in relation to the die recess, further provision being made to dispose the slots for a given pair of lead-ins on a straight line.

This arrangement makes it possible to simultaneously introduce into the reaction zone of the device a plurality of lead-ins for diverse measuring circuits and avoid the failure of electric circuits during reaction occurrence in the chamber.

BRIEF DESCRIPTION OF THE DRAWING

The present invention is illustrated hereinbelow by the description of an exemplary embodiment thereof to be read in conjunction with the drawings, wherein.

DETAILED DESCRIPTION OF THE PREFERRED EMBODIMENT

Figure 3:
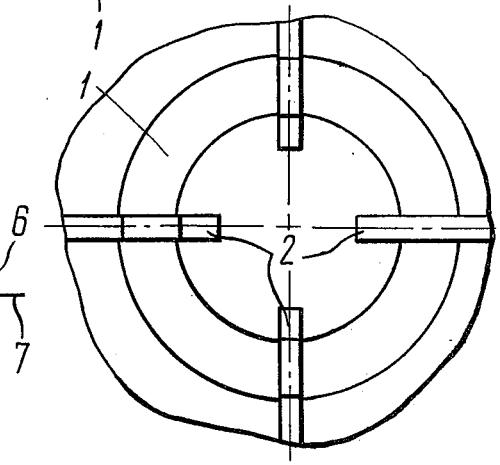
FIG. 3 shows a die furnished with four radial slots for lead-ins.

The device (FIG. 9), according to the present invention, comprises two dies 1 furnished with recesses; radial slots 2 (FIG. 3) made in the body of the bottom die are intended for accommodating the conductors that lead to the high pressure and temperature reaction zone, two opposing slots being disposed on a straight line; a container 3 with an aperture, includes a protective tube 4 made from a heat- and electroinsulating material, e.g., alumina, passing through a reaction mass 5. The space around the container 3 is packed with a porous and plastic insulating material in the form of a ring 6. Current conductors 7 are insulated from the die body with a heat- and electroinsulating material 8, e.g. lithographic stone powder.

Figure 1:
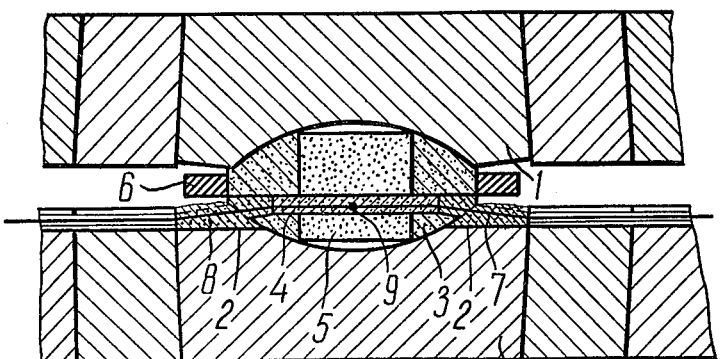
FIG. 1 presents a general view of the device (prior to carrying out the experiment) in longitudinal section taken through the slot that accommodates lead-ins.
Figure 2:
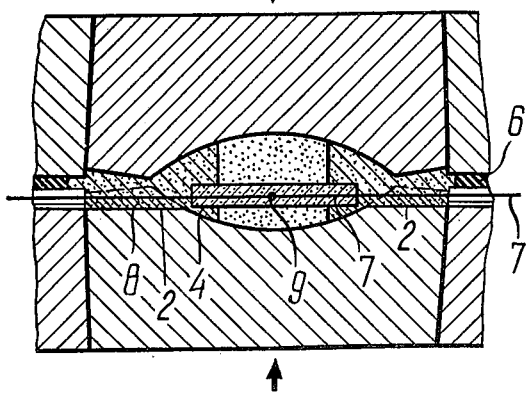
FIG. 2 is a general view of the locked device in the longitudinal section of FIG. 1.

The present device functions in the following manner. Closing the dies 1 by means of a press (not shown in the drawings) causes the exterior part of the container 3 made from lithographic stone to flow, thereby displacing the porous and plastic ring 6 (FIG. 2) and filling the space between the dies 1.

The conductors (lead-ins) 7 are disposed in the radial slots 2 (FIG. 2) outside the zone of intensive flow experienced by the material of the container 3 in the course of loading and, hence, the effect exerted on the conductors by deforming forces will be at a minimum.

The superior reliability of the present device has been demonstrated by laboratory experiments involving temperature measurements in the course of synthesis of superhard material.

In the embodiment of the device, according to the present invention, described herein-before, the conductors 7 are connected to a thermojunction 9 and serve for temperature measurements in the reaction zone, but those skilled in the art will readily appreciate that the reliable lead-in, according to the invention, may be connected to any sensitive element to be placed in the reaction zone in compliance with the objects pursued by the process being effected in the reaction zone.

We claim:
1. A high-pressure and high-temperature device comprising: two identical complementary dies having closing surfaces at least one of which contains a plurality of slots therein, the closing surfaces having recesses so that when the dies are locked in assembly to form a die body, a reaction chamber is formed by the recesses and the slots are disposed in the die body; a container made from a heat and electro-insulating material, which material exhibits plastic properties when subjected to uniform compression, the container with a reaction mass placed therein, being compressibly disposed in the reaction chamber and between the dies in assembly; and lead-ins placed in the slots in the die body and electrically insulated therefrom, so that the lead-ins, which extend into the reaction mass, are disposed outside the zone of intensive flow of the container material, which flow occurs during compression thereof in the course of assembly of the two complementary dies.

2. The device as claimed in claim 1, wherein the lead-ins are wire conductors connected to a thermojunction which thermojunction is placed inside the container and serves to measure the temperature inside the container and the temperature of the reaction mass.

3. The device as claimed in claim 2, wherein the conductors are insulated with powdered lithographic stone.

4. The device as claimed in claim 2, wherein the slots for each of the lead-ins are arranged radially in relation to the die recess, the slots for two lead-in conductors of a given pair of lead-ins being disposed on a straight line.

* * * * *